June 16, 1931.  E. W. WEAVER  1,810,194
DIFFERENTIAL MECHANISM
Filed Sept. 27, 1928  2 Sheets-Sheet 1

INVENTOR
ELVERTON W. WEAVER.
BY
Fay, Oberlin & Fay
ATTORNEYS

June 16, 1931.  E. W. WEAVER  1,810,194
DIFFERENTIAL MECHANISM
Filed Sept. 27, 1928   2 Sheets-Sheet 2
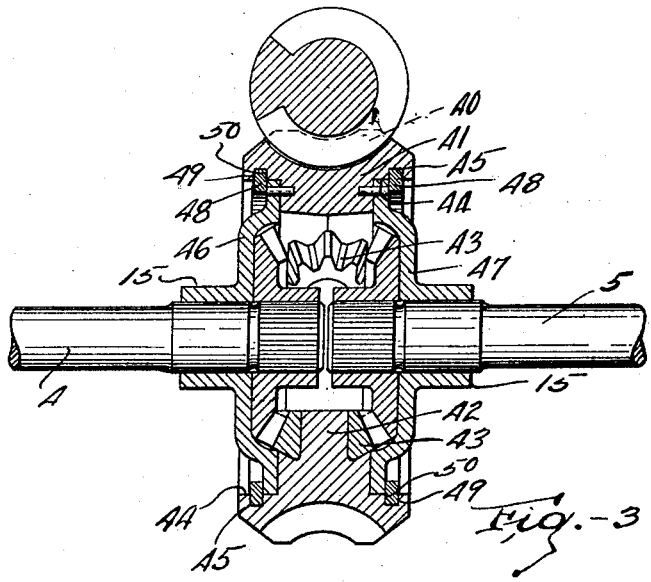
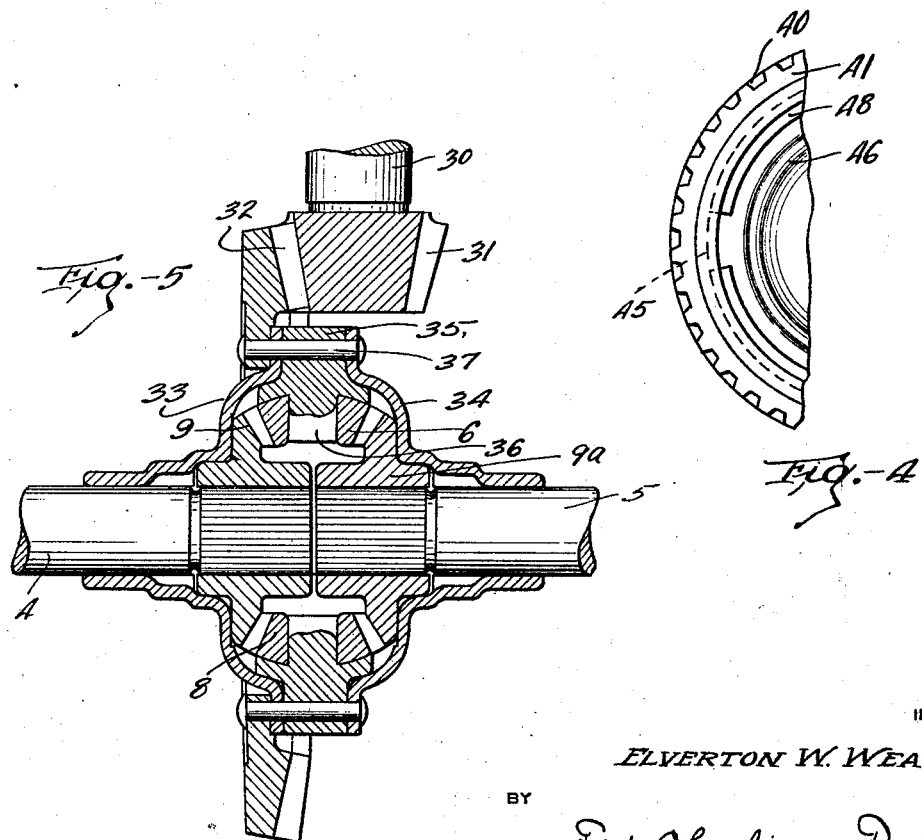
INVENTOR
ELVERTON W. WEAVER
BY
Fay, Oberlin & Fay
ATTORNEYS Patented June 16, 1931

1,810,194

UNITED STATES PATENT OFFICE

ELVERTON W. WEAVER, OF CLEVELAND HEIGHTS, OHIO, ASSIGNOR TO THE COLUMBIA AXLE COMPANY, OF CLEVELAND, OHIO, A CORPORATION OF OHIO

DIFFERENTIAL MECHANISM

Application filed September 27, 1928. Serial No. 308,749.

The present invention, relating, as indicated, to differential mechanism, is more particularly directed to an improved differential carrier for use in a differential mechanism in automobile axles and for similar purposes in which a single driving element is employed to operate two aligned shafts. The differential mechanism of course translates the drive from the driving element to the two shafts in such a way as to permit of the differentiated speed between these two shafts as the occasion requires.

The principal object of the invention is the provision of a new and improved carrier mechanism for such a differential and one in which a number of parts are reduced and the entire device considerably simplified as compared with the mechanism now in general use.

To the accomplishment of the foregoing and related ends, said invention, then, consists of the means hereinafter fully described and particularly pointed out in the claims; the annexed drawings and the following description setting forth in detail certain mechanism embodying the invention, such disclosed means constituting, however, but one of various mechanical forms in which the principle of the invention may be used.

In said annexed drawings:—

Figure 1:
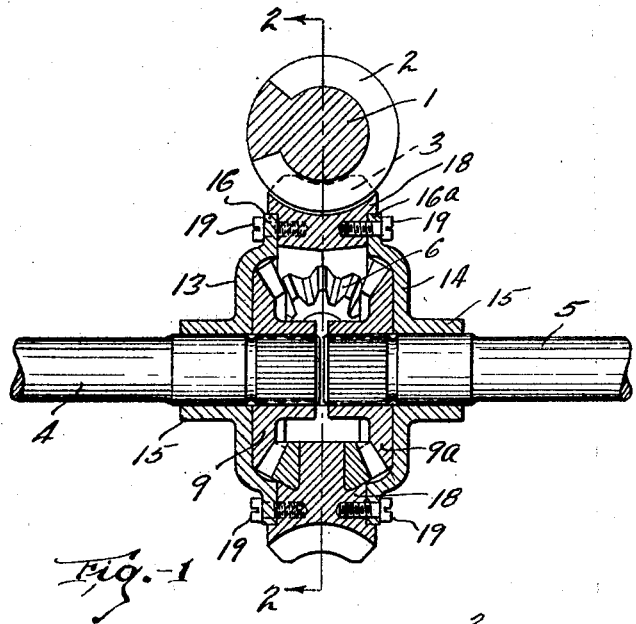
Figure 2:
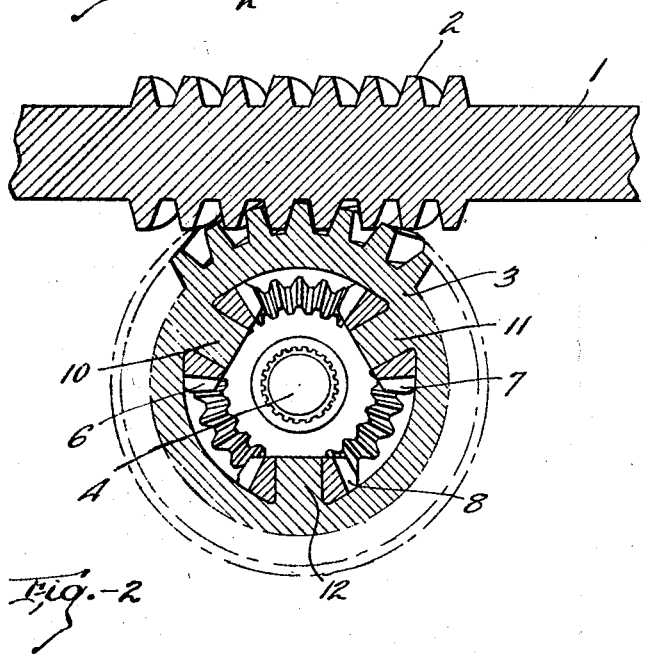

Fig. 1 is a transverse vertical section through one form of my improved mechanism; Fig. 2 is a longitudinal section on the line 2—2, Fig. 1; Fig. 3 is a section similar to that of Fig. 1 showing a modification of the construction; Fig. 4 is a partial side elevation of the mechanism of Fig. 3; and Fig. 5 is a central transverse section of a modification of the construction of Fig. 1.

Referring now to Fig. 1, there is shown a driving differential mechanism consisting of a worm shaft 1, a worm 2 thereon, a worm gear 3 engaged with, and driven by, the worm 2, and axle shafts 4 and 5 driven from the worm gear 3 by my improved differential mechanism now to be described. The differential mechanism proper consists of bevel gears 6, 7 and 8 engaged with bevel gears 9 and 9ª, respectively, which are removably, but nonrotatably secured to the ends of the aligned axle shafts 4 and 5. In ordinary practice the differential carrier consists of an element having two, three or four bearing members mounted in the same plane, but at angles to each other and the bearing members carrying intermediate pinions or bevel gears, which are engaged on opposite sides by bevel gears mounted on the axle shafts.

My new improvement consists in the elimination of this intermediate cross and the formation of integral bearing members on the inner surface of the driven gear element 3, which may of course either be a worm gear or a bevel gear as shown in Fig. 5. Referring to Fig. 2, in which there is shown the worm gear 3, it will be seen that this gear is hollow and is provided with a plurality of integral inwardly projecting cylindrical bearing members 10, 11 and 12, on which are rotatably mounted the bevel gears 6, 7 and 8, respectively. These bevel gears 6, 7 and 8 are engaged on their opposite sides by the two gears 9 and 10 and are held in position on the bearing members thereby, it being unnecessary to otherwise secure these gears on the members 10, 11 and 12.

The entire assembly of gearing is now secured in this relation by means of two cases 13 and 14, each of which is provided with a cylindrical hub 15, in which is received one of the shafts 4 or 5 and with lateral projecting flanges 15 and 16, which engage against the side walls of the lower or body portion 18 of the worm gear 3 and, if desired, these flanges may be received within recesses formed in the side walls of the body portion of the worm gear, as shown in Fig. 1. The cases are then locked in this position by means of cap screws 19. It will be observed that the cases 13 and 14 engage over the shafts 4 and 5 and against the side walls of the gears 9 and 9ª, but not against the outer circumferential portions of these gears, although in practice the bearing engagement may be either on the shafts or on the circumference, or on a special flange on the bevel gears, as desired.

In Fig. 5 I have shown a modification of the construction just described, in which bevel gears are employed for transmitting the drive from the driving shaft 30 to the differential mechanism. The shaft 30 carries a bevel gear 31 engaging and driving the bevel gear 32, which is in turn secured to the enclosing casings 33 and 34 and to a ring 35 carrying the inwardly extending bearing members 36 for the bevel gears by means of a series of rivets 37 which extend through the recesses, the ring 35 and the body portion of the gear 32. Otherwise, the construction there shown is substantially similar to that already described.

In Fig. 3 I have shown a modification of the means already described for locking the cases to the body portion of the driven gear element. In this construction a worm gear 40 is provided with an inwardly extending body portion 41 carrying members 42 for the bevel gears 43, and is also provided with a recessed portion 44 in the outer circumferential surface of which is formed an encircling slot 45. In assembling this mechanism the cases 46 and 47 are disposed on either side of the body member 41 of the worm gear, the outer flanged portion of the recesses engaging in the recesses 44 and being locked in this position by a resilient snap ring 48, which may be formed with convergent or tapered surfaces 49 and 50 allowing it to be driven into the slot 45, where it is retained by the resiliency of the ring or other means. This ring, which is shown in partial side elevation in Fig. 4, serves to securely lock the cases in position, securing the entire mechanism in the desired relation and providing a substantially continuous support for the flanges of the cases.

My improved mechanism possesses the important advantage of materially decreased size for the same capacity compared to current mechanism of this type as well as the additional advantages of simplicity, relatively low cost of manufacture and convenience of assembly. A further advantage lies in the better lubrication possible with the elimination of the interior bearing element.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In differential mechanism, the combination of a gear element having a hollow body portion provided with recesses on its opposed lateral faces and circumferential slots in the outer walls of said recesses, casings disposed in said recesses and resilient rings engaged in said slots and against said casings, whereby said casings are removably locked in engagement with said gear element.

2. In differential mechanism, the combination of a gear element having a hollow body portion provided with recesses on its opposed lateral faces and circumferential slots in the outer walls of said recesses, casings disposed in said recesses and tapered resilient rings engaged in said slots and against said casings, whereby said casings are removably locked in engagement with said gear element.

3. In a differential, the combination of a driven, annular hollow gear element having a plurality of spaced integrally projecting bearing members, gear elements rotatably mounted on said bearing members, annular disks removably secured to the sides of said hollow gear element and forming therewith an enclosed casing, each of said disks being provided with a projecting axial hub and a pair of gear elements rotatably mounted within said casing adjacent the inner surface of said disks and engaged with said first named gear elements, each said sets of gear elements serving to maintain the other in proper assembly.

4. In a differential, the combination of a driven, annular hollow gear element having a plurality of spaced integrally projecting bearing members, gear elements rotatably mounted on said bearing members, annular pressed metal disks removably secured to the sides of said hollow gear and forming therewith an enclosed casing, projecting axial hubs formed on said disks, two other gear elements engaging said first-named gear elements on opposite sides thereof and receiving a bearing upon the inner surface of said disks, and shafts non-rotatably engaged with said last named gear elements.

5. In a differential mechanism, the combination of a gear element having a hollow body portion provided with recesses on its opposed lateral faces, casings disposed in said recesses and removable rings mounted exteriorly of said casings to retain the latter in said recesses.

Signed by me, this 25th day of September, 1928.

ELVERTON W. WEAVER.